J. B. YOUNG.
NUT LOCK.
APPLICATION FILED MAR. 7, 1913.

1,099,005.

Patented June 2, 1914.

Witnesses
Chas. E. Kemper.
Wm J Koerth

Inventor
J. B. Young.
By Victor J. Evans
Attorney

UNITED STATES PATENT OFFICE.

JOHN B. YOUNG, OF LOS ANGELES, CALIFORNIA.

NUT-LOCK.

1,099,005.   Specification of Letters Patent.   Patented June 2, 1914.

Application filed March 7, 1913. Serial No. 752,715.

*To all whom it may concern:*

Be it known that I, JOHN B. YOUNG, a citizen of the United States, residing at Los Angeles, in the county of Los Angeles and State of California, have invented new and useful Improvements in Nut-Locks, of which the following is a specification.

The present invention relates to lock nuts, and resides in the construction, combination and arrangement of parts set forth in the following description and falling within the scope of the appended claims.

Figure 1:
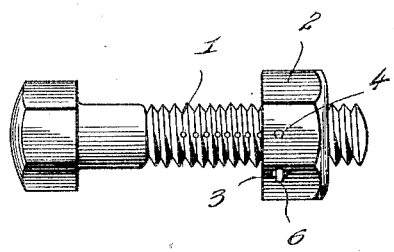
Figure 2:
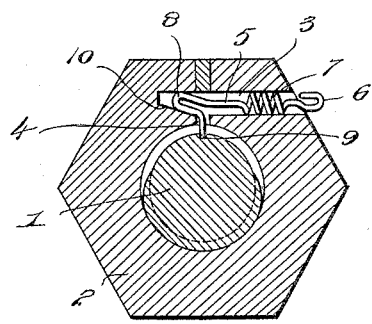
Figure 3:
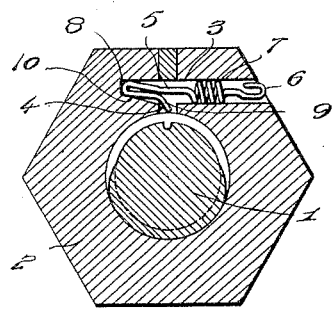

In the drawing: Figure 1 is a view of a lock nut constructed in accordance with my invention and showing the same in applied position on a bolt, Fig. 2 is a sectional view illustrating the arrangement of the locking member of the nut co-acting with the threads of the bolt, and Fig. 3 is a similar sectional view but illustrating the locking element brought out of engagement with the threads of the bolt to permit of the removal of the bolt from the nut.

Referring now to the drawing in detail, the numeral 1 designates a bolt of any ordinary construction which may have its threaded shank provided with longitudinal notches, as indicated in Fig. 1.

The numeral 2 indicates a nut of the ordinary construction and which is adapted to have its threaded bore co-act with the threaded shank of the bolt 1. The nut is provided with a longitudinally extending depression or channel 3 which enters from one of the faces of the nut and terminates a suitable distance away from the opposite face of the nut. This channel is arranged above the bore of the nut, but the nut is further provided with an opening 4 which enters the said bore of the nut as well as the channel 3. The opening 4 may be provided by drilling the nut at a right angle to its channel 3 and a filler member or block inserted in the portion of the opening above the channel, as will be clearly understood.

The numeral 5 designates the locking element for the nut. This element is preferably constructed from a single strand of spring wire, and has its outer end bent to provide an eye 6 which normally projects through the channel 3 to the outer face of the nut. The wire is coiled to provide a helical spring 7, the said spring frictionally engaging with the wall of the channel 3. The opposite end of the body portion of the strand 5 of the lock is bent upwardly and outwardly at an angle as designated by the numeral 8, and is from thence turned downwardly and at a direct right angle to the body 5 to provide an engaging tooth 9 which normally extends through the opening 4 to within the bore of the nut and as a consequence into engagement with the threads of the shank of the bolt, and to within one of the series of notches provided by the threads. When it is desired to raise the tooth 9 out of engagement with the threads of the bolt, an inward pressure upon the eye 9 will force the lock inwardly so that the tooth 9 will contact with the inner wall of the opening to cause the same to bend and to be entirely received within the said opening 4. However, I have found it desirable to provide the lower wall of the channel 3 beyond the inner wall of the opening 4 with an inclined lower portion 10 upon which the strand of the portion 8 rests and which when the member 5 is forced within the channel 3 will guide the tooth 9 upwardly out of the bore of the nut.

From the above description, taken in connection with the accompanying drawing, the simplicity of the device, as well as the advantages thereof, will, it is thought, be perfectly apparent to those skilled in the art to which such inventions appertain without further detailed description.

Having thus described the invention, what I claim is:

1. In a device for the purpose set forth, the combination with a bolt and a nut therefor, said nut having a transversely extending channel disposed away from its bore and being further provided with an opening which communicates with the bore of the nut and with the channel, the wall of the channel beyond the opening being inclined toward the end of said channel, a locking element arranged within the channel, said element comprising a member which has one of its ends extending through the channel and its opposite end bearing against the inclined wall of the channel, and being further provided with a tooth which projects through the opening into the bore of the nut and into engagement with the teeth of the bolt.

2. In a device for the purpose set forth, the combination with a bolt and a nut therefor, said nut having a transverse channel which opens at one of its faces and which is disposed away from its bore, the said nut being further provided with an opening which communicates with the bore of the nut and with the channel, the wall of the channel adjacent the opening being inclined at an angle to the terminal wall of the channel, a locking member, said locking member being constructed from a strand of wire having one of its ends bent to provide an eye which projects through the channel, the said member being coiled to provide a helical spring which frictionally contacts with the wall of the channel, the opposite end of the member being bent upwardly to contact with one of the straight walls of the channel and being bent downwardly at an angle, the said angular portion being arranged upon the angular portion of the channel and terminating in a tooth which projects through the opening of the nut into the bore of the nut and into engagement with the threads of the bolt.

In testimony whereof I affix my signature in presence of two witnesses.

JOHN B. YOUNG.

Witnesses:
C. F. BROWN,
JOE M. FINN.

Copies of this patent may be obtained for five cents each, by addressing the "Commissioner of Patents, Washington, D. C."